Aug. 28, 1934.　　　H. C. EDWARDS　　　1,971,905
INTERNAL COMBUSTION ENGINE
Filed Feb. 13, 1932　　3 Sheets-Sheet 1
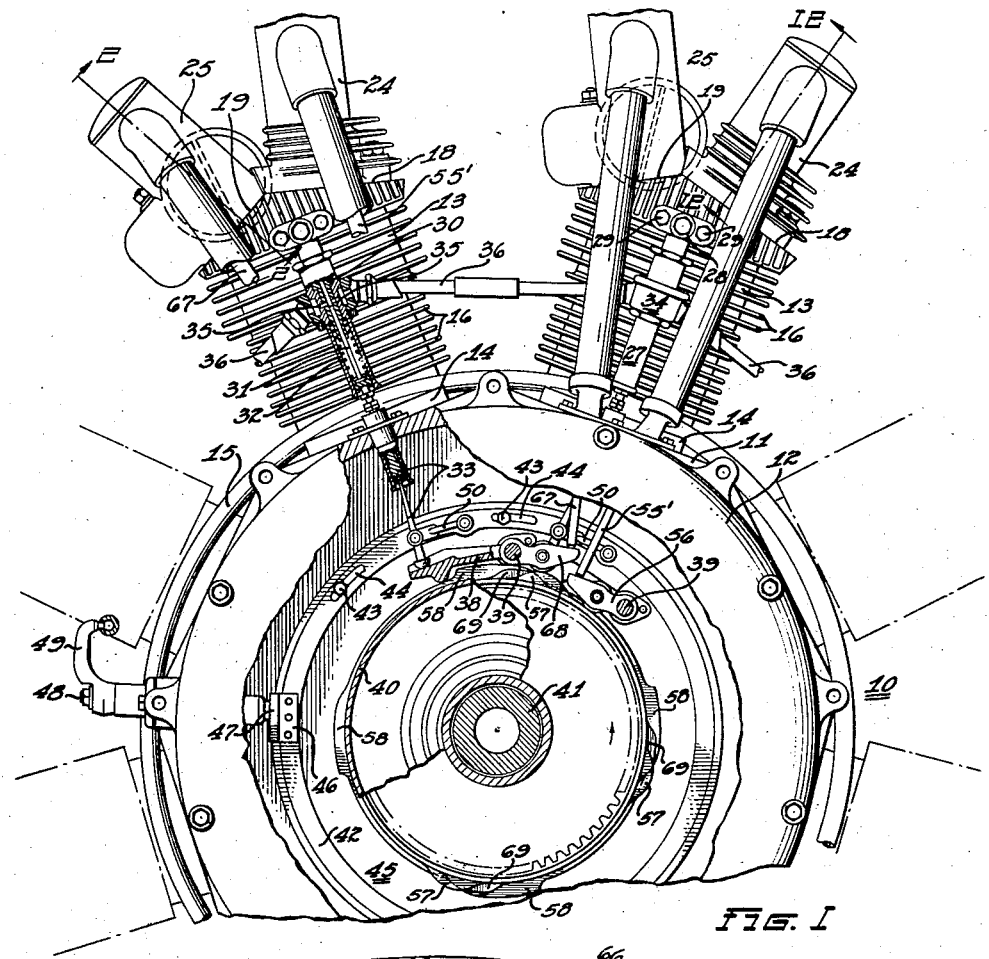
Fig. I
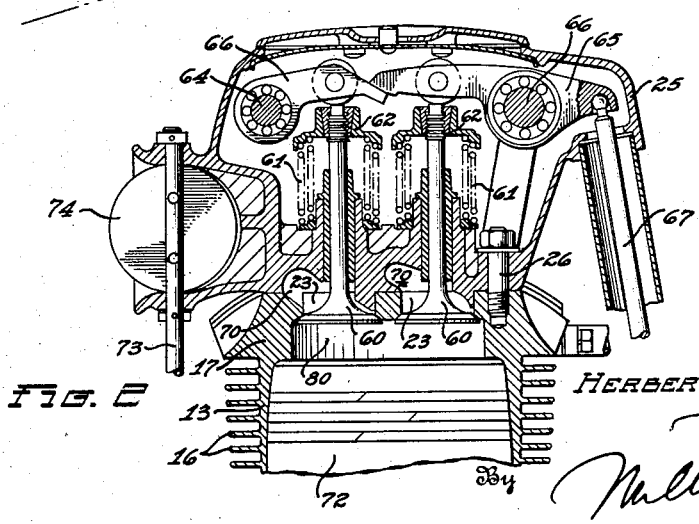
Fig. 2
Inventor
HERBERT C. EDWARDS.
By
Attorney Aug. 28, 1934.  H. C. EDWARDS  1,971,905
INTERNAL COMBUSTION ENGINE
Filed Feb. 13, 1932  3 Sheets-Sheet 2

Inventor
HERBERT C. EDWARDS
By Nullon Titbets
Attorney

Aug. 28, 1934.   H. C. EDWARDS   1,971,905
INTERNAL COMBUSTION ENGINE
Filed Feb. 13, 1932   3 Sheets-Sheet 3
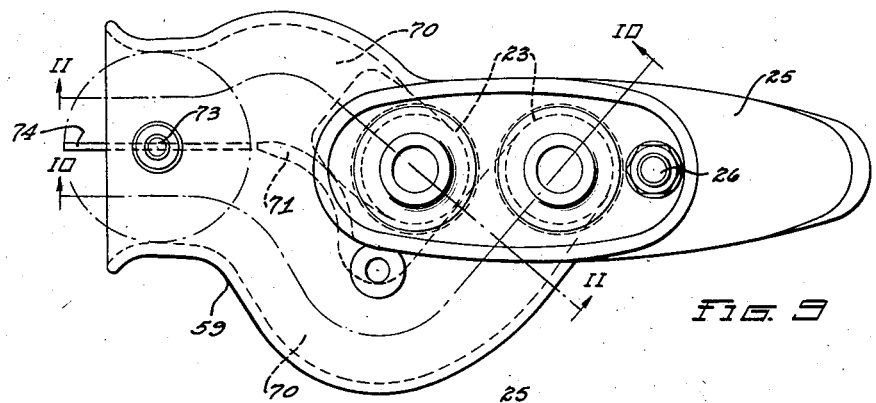
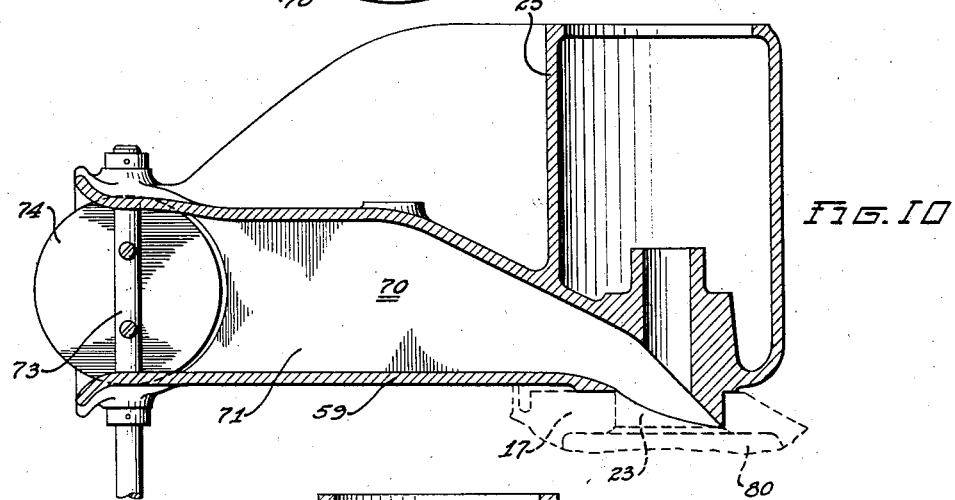
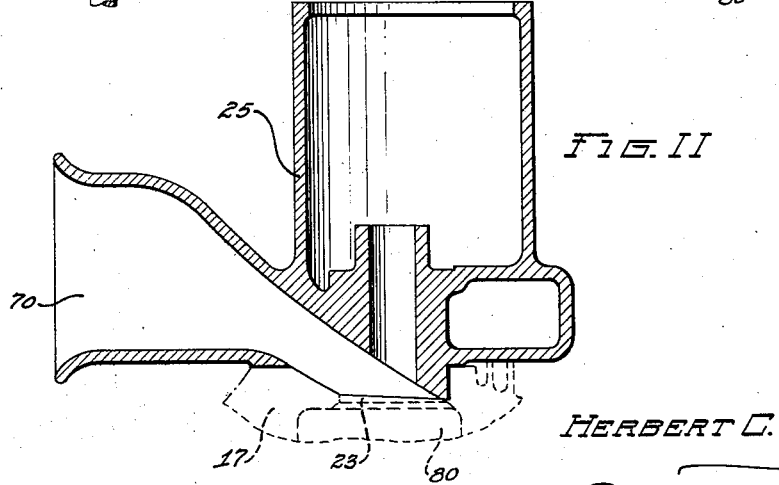
Inventor
HERBERT C. EDWARDS
By
Attorney Patented Aug. 28, 1934

1,971,905

UNITED STATES PATENT OFFICE 1,971,905

INTERNAL COMBUSTION ENGINE

Herbert C. Edwards, Detroit, Mich., assignor to Packard Motor Car Company, Detroit, Mich., a corporation of Michigan Application February 13, 1932, Serial No. 592,767

6 Claims. (Cl. 123—191)

This invention relates to internal combustion engines and more particularly to engines of the fuel injection type.

An object of the invention is to provide a new and novel fuel injection internal combustion engine of the compression-ignition type.

Another object of the invention is to provide a four cycle engine with relatively high compression ratio combustion chambers and valve means of a capacity admitting full volume air charges into the cylinders.

A further object of the invention resides in providing an internal combustion engine having a pair of valve air inlet passages with which a new and novel form of valve operating mechanism is associated.

Still another object of my invention is to provide a high compression four cycle engine of the injection type in which the combustion chambers are of a character such that valves in the heads will fully clear the pistons which travel to the end of the cylinders on their compression strokes.

Another object of the invention is to provide a compression-ignition engine in which a single control is provided for regulating the passage of air into a pair of inlet passages.

Other objects of the invention will appear from the following description taken in connection with the drawings, which form a part of this specification, and in which:

Fig. 1 is an elevational view, partly in section and partly broken away, looking at the rear of an engine having my invention incorporated therewith;

Fig. 2 is a sectional view through one of the cylinders taken on line 2—2 of Fig. 1;

Fig. 9 is a top plan view of one of the air inlet manifolds and the associated valve housing;

Fig. 10 is a developed sectional view of the same taken on line 10—10 of Fig. 9;

Fig. 11 is another sectional view taken on line 11—11 of Fig. 9;

Figure 3:
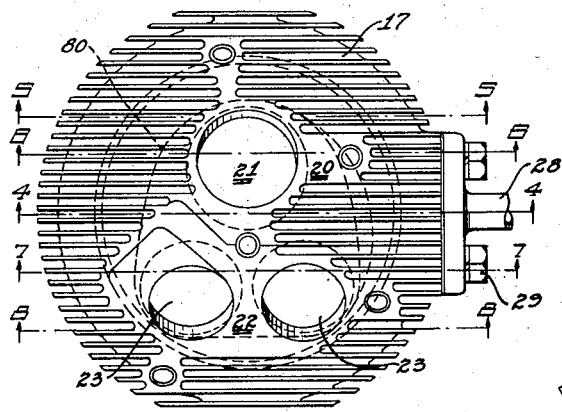
Fig. 3 is a top plan view of one of the cylinders with the valve housings removed.
Figure 5:
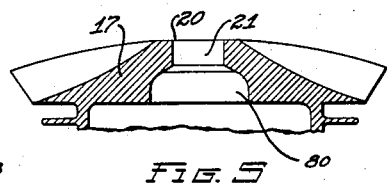
Fig. 5 is a section of the head taken on line 5—5 of Fig. 3.
Figure 6:
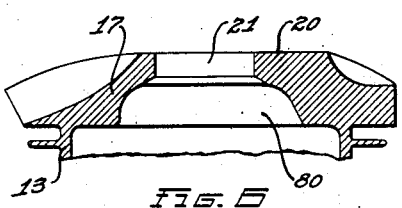
Fig. 6 is another section of the head taken on line 6—6 of Fig. 3.

Referring now to the drawings by characters of reference, 10 represents generally a four cycle, fuel injection type of engine in which air and oil are introduced separately into and mixed in the combustion chambers to be ignited by the heat of compression. 11 indicates a barrel type of crank case and 12 a rear cover therefore, cylinders 13 extending radially from the crank case. The cylinders are provided with flanges 14 which bear against the crank case and are held down, in such position, by a pair of endless bands 15. Such band means are arranged to be placed in tension greater than that to which they are subjected by explosion forces in a high speed self igniting engine of the type illustrated.

The cylinders are preferably formed of steel so that the air cooling fins 16 can be closely spaced and of a thin character, and also so that a light but rugged construction can be had as the engine illustrated is designed particularly for use with aeroplanes where lightness is an important factor. The cylinder heads 17 are formed as an integral part of the structure and the outer wall thereof is formed with a plurality of parallel fins which are cut to extend in the direction of the air flow when the engine is assembled as the power plant of a vehicle. As shown in Fig. 1, the cylinders are milled off so that the top wall has two angularly disposed faces 18 and 19, such milling operation being of sufficient depth to form a flat surface 20 surrounding the exhaust port 21 which extends through the face 18 and the head. The face 19 is also milled to an extent such that a flat face 22 is provided around the air inlet ports 23 which extend through the top wall of the head. Associated with and seated upon the flat portion 20 of each head is a valve housing 24 and associated and seated upon the flat face 22 of each head is a valve housing 25. Such housings are secured to the cylinder heads by suitable bolt or stud means as indicated at 26.

There is an oil injection means associated with the cylinders and, as illustrated, such means consists preferably of an injection device associated with each cylinder. Such devices can take any conventional form as long as they are of the high pressure type and can be adjusted to vary the timing and quantity of fuel delivered.

Figure 4:
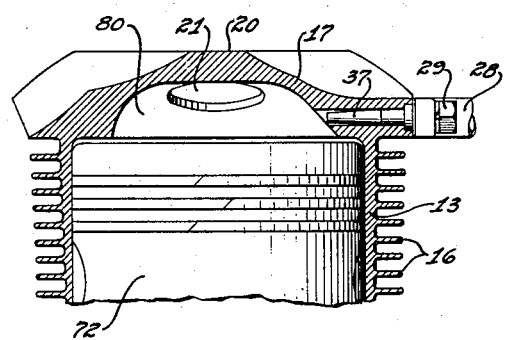
Fig. 4 is a fragmentary sectional view of one of the cylinders having the valve housings removed.
Figure 7:
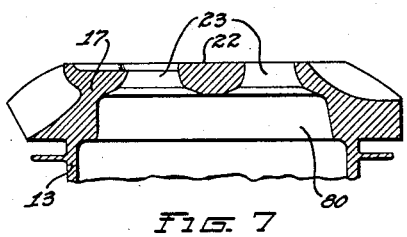
Fig. 7 is a section of the head taken on line 7—7 of Fig. 3.
Figure 8:
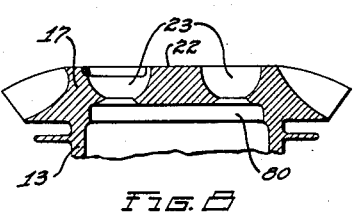
Fig. 8 is a sectional view of the head taken on line 8—8 of Fig. 3.
Figure 12:
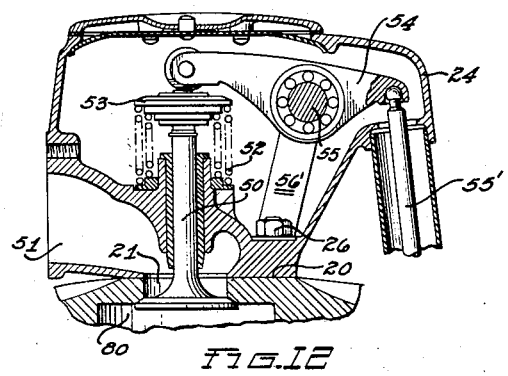
Fig. 12 is a sectional view taken on line 12—12 of Fig. 1.

The injection devices are similar and each consists of a pump section 27 and a nozzle section 28, such sections being secured together as an integral unit which is fastened to the cylinder head by bolts 29. In the pump housing there is a barrel 30 in which reciprocates the plunger 31, the coil spring 32 normally moving the plunger in a direction away from the nozzle section and articulated push rod mechanism 33 being actuated to move the plunger in its injection stroke. A circular manifold 34 surrounds each pump housing and ports, as indicated at 35, extend through the housing and the barrel and communicate with the manifolds, the adjacent manifolds being connected by suitable conduit means, as indicated at 36, with one of which is connected a source of oil supply (not shown) under low pressure. The nozzle sections terminate in an atomizer portion 37 which extends through the wall of the cylinder heads, as shown in Fig. 4, so that oil can be injected into the chamber formed therein.

Each articulated push rod bears against a rock lever 38 which is mounted upon the shaft 39 within the crank case and is formed with a curved bearing face along which the articulated rod is adjustable lengthwise. The rock levers engage the cam 40 which telescopes the crank shaft 41 and is driven therefrom at a reduced speed through suitable reduction gearing (not shown).

The stroke of the pump plungers, after closing the ports 35, determines the quantity of fuel displaced through the nozzle, and consequently adjustment of such stroke will regulate the timing and the quantity of oil delivered into the combustion chambers. In order to regulate this quantity of oil, I provide a ring member 42 which is held within the crank case by bolts 43 extending through arcuate slots 44 therein and secured to the transversely extending inner crank case wall 45. The ring is provided with a member 46 having a rack portion engaged by a pinion 47. The pinion is carried by a shaft 48, and an arm 49 is secured to such shaft so that the operator can rotate the arm and thereby transmit rotary movement to the control ring 42. Links 50 connect one section of the articulated push rods with the control ring so that, upon rotational movement of the ring, the push rods will be adjusted along the curved faces of the rock levers 38 and, in this manner, the strokes thereof can be varied. By moving the push rods toward the free end of the rock levers, the effective stroke of the plungers 35 will be increased and the timing of the charge injection advance, and as the push rods are adjusted toward the shafts 39, the plunger strokes and the timing will be decreased. The range of adjustment of the articulated push rods on the curved faces of the rock levers is such that, when the push rods are in their extreme position toward the shafts 39 on the curved faces of the rock levers, the pump plungers will not be given sufficient stroke to close the ports 35 and therefore the engine will not operate as no fuel will be delivered into the cylinders.

Within each of the housings 24, mounted on the angular end faces 20 of the cylinder heads, is provided mechanism for controlling the passage of exhaust gases from the cylinders. A poppet valve 50 extends through a bearing carried by each housing and the head portion thereof is normally held closed against the inner end of the exhaust port 21 by coil springs, as indicated at 52, such springs bearing against a retainer 53 fixed to the end of the valve stem. A rock lever 54 is mounted upon a shaft 55 carried by a bracket 56' within the housing and is rocked in a direction to open the exhaust valve by conventional push rod means, as indicated at 55'. These push rod means 55' extend into the crank case and bear against the free ends of rock levers 56 which are mounted upon the shafts 39. The cam is provided with a row of lobes 69 for actuating the exhaust rock levers 56 and with another row of lobes 58 for actuating the rock levers 38. The exhaust passage 51 in the housings 24 extend, in the main, substantially normal to the valve stem and communicate with the exhaust ports 21 formed in the cylinder heads.

As previously set forth, the angular faces 32 of the cylinder heads are formed with a pair of air inlet ports 23, and associated with this portion of the head is a combined valve housing 25 and air inlet manifold 59, this combined manifold and housing being formed preferably as a casting. A pair of valves 60 extend through each of the housings 25 and are mounted to reciprocate in bearings therein, coil springs 61 being associated with retainers 62 for normally maintaining the valve heads seated against the inner end of the air inlet ports 23 in the cylinder heads. A rock lever 63 is mounted on a shaft 64 in each housing and engages the end of one of the valves 60 while another rock lever 65 is mounted on a shaft 66 in the housing and engages with the end of the other valve 60. The shafts 64 and 66 are arranged in parallel relation at opposite ends of the valve housing structure and the pair of rock levers in each housing extend across the ends of the pair of valves in aligned relation and with the free end of the rock lever 65 overlying and bearing against the free end of the rock lever 63. Push rod means 67 extend into each housing and engage the rock levers 65 to rock them in a direction for opening the valves 60, such push rod means extending into the crank case where they engage rock levers 68. These rock levers are mounted on the shafts 39 and extend in an opposite direction to the other rock levers mounted on the same shaft, thus the rock levers mounted on each of the shafts 39 are arranged so that the air inlet valves of one cylinder, and the fuel injection device and the exhaust of an adjacent cylinder are actuated thereby.

The cam is also provided with a row of lobes 57 for actuating the air inlet valve rock levers 68. Engagement of the lobes 57 with the rock levers 68 move the push rod mechanisms 67 outwardly thus opening the valves 60. Rocking of the lever 65 will rock the associated rock lever 63 therewith, due to the overlying aligned relation, and thus through means of a single push rod mechanism each pair of air inlet valves 60 are moved to open position. The three rows of lobes on the cam are arranged so that the devices which they actuate will function at a desired time and the cam is preferably driven from the crank shaft at ½ its speed. As the engine illustrated is of the nine cylinder type, the cam will actuate each of the rock levers engaging with the lobes thereon once in every two revolutions of the crank shaft, there being four cam lobes in each row.

The combined air inlet manifold and valve housing structures are preferably formed integral and are provided with a pair of passages 70 which are arranged to communicate with the ports 23 and such passages are divided by a partition wall 71. The passages are preferably formed to provide a venturi and thus accelerate the movement of air sucked into the cylinders by the pistons 72, and the passages and ports 23 with which they connect are located with respect to the cylinder head so that air will pass into the cylinders tangentially to the inner wall and at an angle to the cylinder axis whereby inducing rotation of the incoming charges.

The outer end of the manifold 59 is open to atmosphere and the partition 71 stops short of the outer end of the manifold. Extending transversely and centrally through the outer end of the manifold is a shaft 73 upon which is fixed a butterfly valve 74 for controlling the quantity of air passing into the cylinders when the valves 60 are open. The shafts 73 extend radially and suitable mechanism (not shown) can be associated therewith for operating them simultaneously and uniformly. The butterfly valves are of substantially the same diameter as the outer end of the air inlet manifold in which the two passages extend to the ports 23, and thus, a single valve can be utilized to control the air supply passing through each of the passages for each cylinder.

The pistons 72 are associated with the cylinders so that they closely approach the inner face of the cylinder dome when at the end of their stroke, and this is possible because the combustion chamber is formed in the cylinder head, as indicated at 80. With this arrangement of the combustion chambers, the valves will have full clearance in their opening movement without restricting in any degree the movement of the pistons toward the cylinder heads and thus there will be no danger of the valves being broken by piston contact provided they should become displaced from their normal operating relation. This arrangement of combustion chambers also permits a high compression ratio which is of a decided advantage with Diesel engines and particularly with Diesel engines of the high speed type.

The combustion chambers formed in the cylinder heads are of considerably less diameter than the cylinders, and are of small dimensions in a direction axially of the cylinders, thus it is evident that the compression ratio will be very high. The injection devices are associated with the cylinder heads so that the nozzle portions 37 spray liquid fuel into the combustion chambers in a direction radially of the compressed rotating air charges.

The engine illustrated is of the four cycle type and the charges are drawn into the cylinder upon the suction strokes of the pistons in a manner such that they rotate therein and continue the rotation under the compression strokes of the piston. The fuel charges are injected into the compressed rotating air charges near the end of the compression strokes whereupon the fuel is thoroughly mixed with the rotating air charges and forms a mixture which will ignite by the heat of compression so that explosion takes place substantially at the time the pistons reach top center in their compression strokes. The cylinder heads are recessed forming combustion chambers and the wall surfaces forming the recess are curved so that there will be no interference with air rotation. It will be noted that the combustion chambers are the widest across the end into which the two inlet ports enter and that the opposite end of the chamber extends more nearly parallel with the cylinder axis.

It will be seen that I have provided a simple form of mechanism utilizing a single push rod for simultaneously and uniformly actuating a pair of air inlet valves. It will also be seen that the combustion chamber and valve arrangement is of a character such that the valves will have full clearance when the pistons are at the end of their strokes. The arrangement of the combustion chambers described permits a high compression ratio and through means of the dual air inlet passages the large quantity of air can be drawn into the cylinders in the very short space of time permitted in the operation of a high speed engine and in a manner such that the air charges will rotate when drawn into the cylinders and further, a single control means being utilized to regulate the quantity of air being drawn into the two passages leading into each of the cylinders. The features herein set forth are instrumental in providing an economical and highly efficient compression engine of the high speed fuel injection type.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In an internal combustion engine of the compression-ignition type, a cylinder, a cylinder head of angular formation having the ridge substantially bisecting the cylinder, one side of the head having a pair of inlet passages therethrough and the other side of the head having an exhaust passage therethrough, and valve means associated with each of the passages.

2. In an internal combustion engine of the compression-ignition type, a cylinder, a cylinder head having an end wall formed of two angularly disposed portions, one portion having a pair of aligned air inlet passages therethrough and the other portion having an exhaust passage therethrough, and valve means associated with each of the passages.

3. In an internal combustion engine, a cylinder, a dome formed integral with the cylinder, said dome having a pair of intake passages therethrough, valve means associated with the passages controlling flow therethrough, a head fixed on the dome, said head being formed with conduit means having individual passages communicating with the dome passages, and a valve member associated with the dome to control flow through the dome passages.

4. In an internal combustion engine, a cylinder, a cylinder dome, a piston in the cylinder, movable to the extreme dome end of the cylinder, a curved combustion chamber in the dome opening into the cylinder and widening toward one end, a pair of inlet passages in the dome opening into the wide end of the combustion chamber, and an outlet passage opening into the narrow end of the combustion chamber.

5. In an internal combustion engine, a cylinder, a cylinder dome having a flat curved combustion chamber therein, said chamber being smaller transversely than the cylinder and of increasing width toward one end, a pair of inlet passages in the dome extending to each side of the wide end of the chamber, an outlet passage in the dome extending centrally of and communicating with the narrow end of the chamber, a piston in the cylinder movable to the extreme dome end of the cylinder, and valves in the chamber controlling flow through the passages.

6. In an internal combustion engine, a cylinder head, and a combustion chamber adjacent the cylinder head having opposite portions of different width, said head having a pair of inlet passages therethrough opening into the wide portion of the chamber and a single exhaust passage therethrough opening into the narrow portion of the chamber, the ends of the passages opening into the chamber being in triangular relation and with the exhaust passage forming the apex.

HERBERT C. EDWARDS.